United States Patent

Needle

[11] Patent Number: 5,828,964
[45] Date of Patent: Oct. 27, 1998

[54] APPARATUS AND METHOD FOR POINT-TO-POINT MULTIPOINT RADIO TRANSMISSION

[75] Inventor: Jack Needle, Dix Hill, N.Y.

[73] Assignee: Bell Atlantic Science & Technology Inc

[21] Appl. No.: 351,986

[22] Filed: Dec. 8, 1994

[51] Int. Cl.⁶ .................................................. H04B 1/00
[52] U.S. Cl. ........................... 455/500; 455/25; 455/132; 455/272; 342/359; 342/367
[58] Field of Search .................. 455/25, 39, 49.1, 455/57.1, 66, 88, 129, 269, 272, 33.3, 426, 526, 500, 562, 132; 342/359, 367

[56] References Cited

U.S. PATENT DOCUMENTS

| | | |
|---|---|---|
| 4,528,656 | 7/1985 | Morals . |
| 4,747,160 | 5/1988 | Bossaro . |
| 4,825,222 | 4/1989 | Butcher . |
| 5,349,631 | 9/1994 | Lee ......................................... 455/33.3 |
| 5,355,520 | 10/1994 | Freeburg et al. .......................... 455/63 |

FOREIGN PATENT DOCUMENTS

| | | | |
|---|---|---|---|
| 2119396 | 5/1990 | Japan .................................. 455/49.1 |
| 5304526 | 11/1993 | Japan .................................. 455/49.1 |

*Primary Examiner*—Doris H. To
*Attorney, Agent, or Firm*—Loren C. Swingle

[57] ABSTRACT

A point-to-multipoint radio broadcast communication system comprises a directional transmitter focused on a particular one of a plurality of receivers in a linear arrangement, such that the angle between each successively closer receiver and the transmitted beam increases as the distance between the transmitter/receiver pair decreases. Thus, a low-power directional transmitter can effectively transmit to a line of receivers due to the trade-off between a receiver being off-center and its closer proximity to the transmitter.

13 Claims, 4 Drawing Sheets

Figure 4

| Receiver | Am | Vert. Dist. | Deg. off Vert | Beam Cent | Deg.off beam |
|---|---|---|---|---|---|
| 60a | 4.0 | 10 | 21.801409 | 4.573921 | -17.23 |
| 60b | 4.0 | 20 | 11.309932 | 4.573921 | -6.74 |
| 60c | 4.0 | 30 | 7.594643 | 4.573921 | -3.02 |
| 60d | 4.0 | 40 | 5.710593 | 4.573921 | -1.14 |
| 60e | 4.0 | 50 | 4.573921 | 4.573921 | 0.00 |
| 60f | 4.0 | 60 | 3.814075 | 4.573921 | 0.76 |
| 60g | 4.0 | 70 | 3.270488 | 4.573921 | 1.30 |
| 60h | 4.0 | 80 | 2.862405 | 4.573921 | 1.71 | ic
APPARATUS AND METHOD FOR POINT-TO-POINT MULTIPOINT RADIO TRANSMISSION

FIELD OF THE INVENTION

The present invention relates in general to communications systems, and more particularly to a point-to-multipoint directional microwave radio communication system.

BACKGROUND OF THE INVENTION

It has been recognized that in order to broadcast a broadband signal to multiple receiving stations, one must either utilize cable transmission arrangements, or use high-frequency, high-power, omni-directional radio transmitters. Such transmitters are high power, high cost devices, and either require line-of-sight to the receivers, or must be higher-powered and omni-directional to utilize reflected signals for communications.

Therefore, to provide TV, Broadband and Telephony through fiber and/or coax cable to an occupied high rise building, would require that cables be installed in a pipe chase, branched out at each floor, strung along the hallways and into each apartment. This type of construction is very costly both in dollars and good will for it will generate objections from landlords and tenants alike. The cable approach is expensive, disruptive, and sometimes impractical.

If radio transmission systems were employed to transmit to receiving antennas in each apartment unit, the transmitters would generally be omni-directional, high-powered, and line-of-sight. Because of the high power requirements, the transmitter could not be solid-state, and would therefore be both expensive and unreliable (as compared to solid state devices).

Row houses would present a similar problem to the apartment house situation. Each house would have to be cabled, or a high-powered radio transmission system would have to be employed.

It is therefore an object of the present invention to provide a broadband broadcast communication system that can be used in apartment buildings or row houses, utilizing low-power, solid-state microwave radio transmission, thereby providing low-cost, reliable transmission signals without the need for cable being run to every receiving unit.

It is a further object of the invention to provide a system which is easy to install and maintain.

It is yet another object of the invention to provide a system which is not esthetically unattractive.

It is still another object of the invention to provide a system which can be easily adapted to 2-way communications.

BRIEF DESCRIPTION OF THE INVENTION

The foregoing problems are overcome by the present invention. A directional transmitting antenna is situated in close proximity to a line of receivers (for example, one receiver for each apartment unit or row house). The transmitter is offset from the line of receivers just enough to provide line-of-sight relationship to each receiver.

The transmitted beam is focused on the farthest receiver, such that the remaining receivers are relatively closer to the transmitter (and therefore suffer less path loss) as the angular displacement from the beam center causes a lessening of the signal strength at the receiver. By this combination of offsetting greater angular attenuation with lesser path attenuation, the signal level is sufficient for broadband communications. Further, the closer (and therefore more angularly displaced) receivers may benefit from increased signal strength due to the reception of side lobes of the transmitted signal.

Alternatively, the beam can be focused on a pre-selected receiver, rather than the most distant receiver, such that the signal strength to the most distant receiver is still adequate for broadband communication. This effectively maximizes the number of receivers that can be serviced from one transmitter.

In a preferred embodiment of the invention, the transmitter can be a low-power, solid state design, thus reducing costs while increasing performance stability and reliability.

These and other objects, features, and advantages of the present invention will become more apparent from the following detailed description, when taken in conjunction with the accompanying drawings, relating to a preferred embodiment.

BRIEF DESCRIPTION OF THE DRAWINGS

FIG. 4 shows calculations of angular displacement of various signals from the beam center.

DETAILED DESCRIPTION OF THE INVENTION

Figure 1:
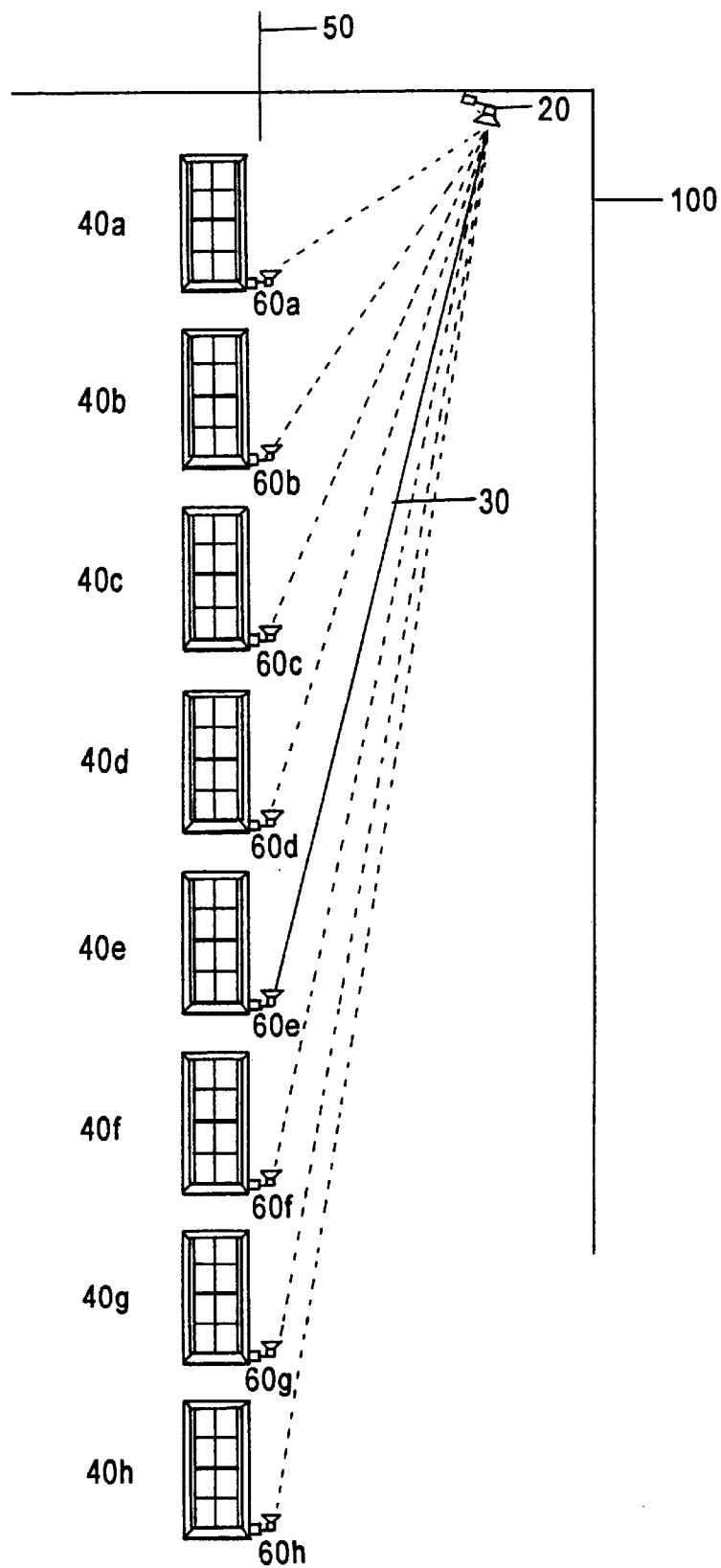
FIG. 1 depicts a multi-story building with a transmitter and multiple receivers.

The present invention provides a point-to-multi-point broadband radio transmission system. FIG. 1 illustrates an exemplary embodiment of such a system in eight story building 100. Beam center 30 is transmitted from transmitter 20 to receiver 60e at the fourth floor window 40e. Transmitter 20 is displaced horizontally from receiver centerline 50 a distance of 4 feet along the roof, such that line of sight relationship is obtained from the transmitter 20 to each receiver (60a . . . 60h). The formula used to calculate the 4 foot distance is: the receiver diameter times the building height divided by the height between floors. In this case the height between floors of building 100 is 10 ft., the height of building 100 is 80 ft., and the diameter of each receiver (6a . . . 6h) is one-half foot. Therefore, the displacement distance would be 4 feet.

Figure 2:
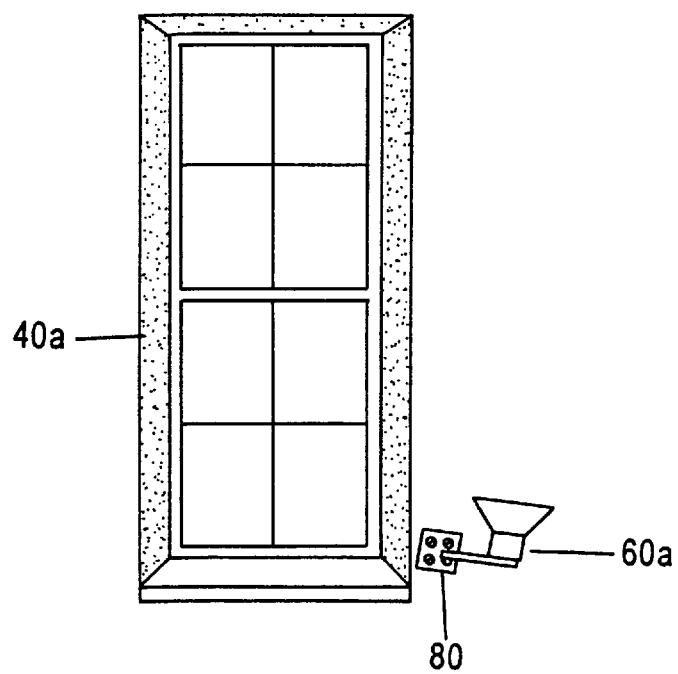
FIG. 2 depicts an apartment window with a blow-up of a receiver.

FIG. 2 is an enlarged view of one window 40a with receiver 60a. The receiver 60a is cabled into the apartment unit associated with window 40a (not shown), which could beneficially be an RG-59 cable. Mounting bracket 80 would secure receiver 60a to the side of building 100 (FIG. 1). Receiver 60a would be aimed at transmitter 20 (FIG. 1). Referring back to FIG. 1, transmitter 20 could advantageously be comprised of a broadband transmitter operating in the 50–250 Mhz range with a narrow beam, high-gain antenna. Receivers 60a . . . 60h could be advantageously comprised of high-gain, low-noise receivers with a narrow beam, high-gain antenna.

Although the instant invention relates generally to a point-to-multipoint transmission system, transmitter 20 and receivers (60a . . . 60h) could advantageously be transceivers, allowing two-way communications capability. Transmitter 20 and receivers (60a . . . 60h) could illustratively be comprised of the AIL 28 Ghz wireless Video System.

Figure 3:
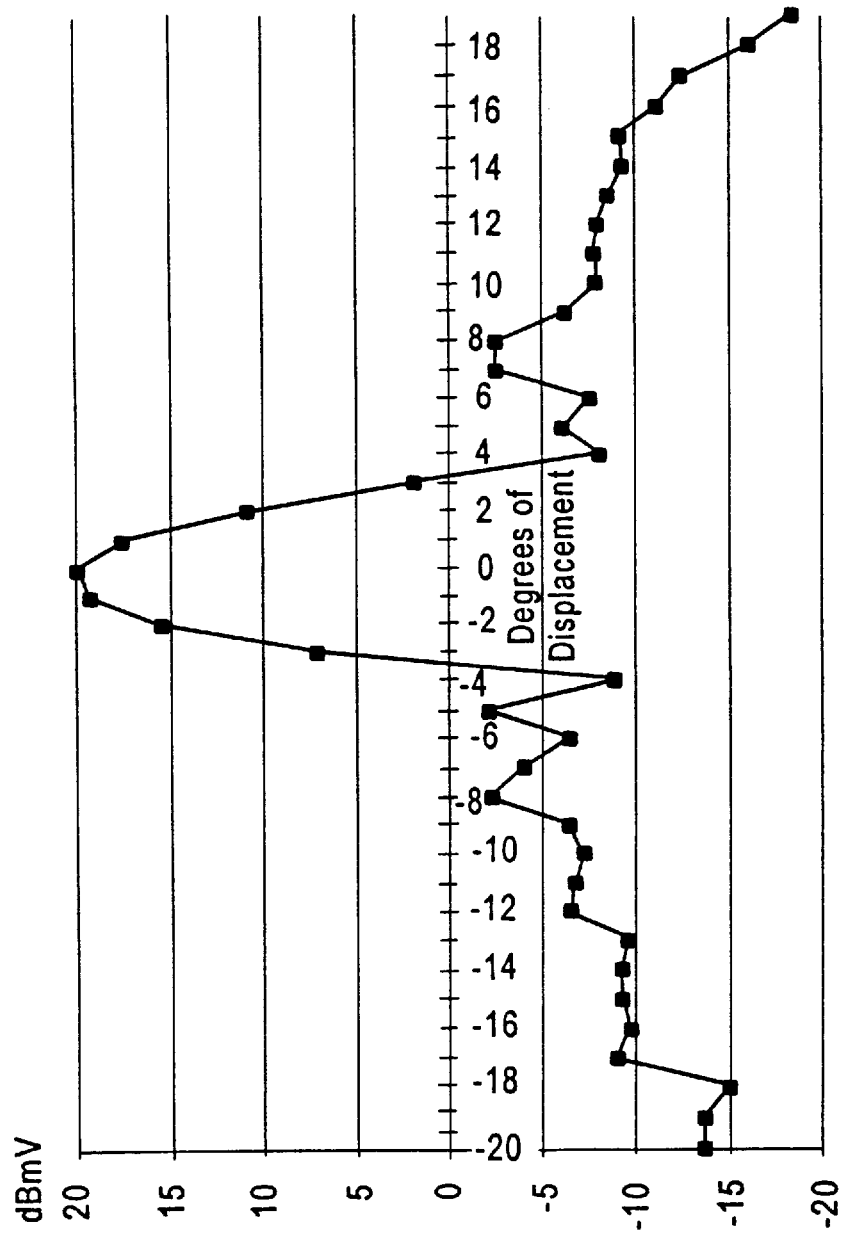
FIG. 3 shows a hypothetical depiction of signal strength at various degrees of angular displacement from a hypothetical transmitter.

FIG. 3 describes a hypothetical power level diagram of received energy (in dBmv) from a 28 Ghz narrow-beam, low-power, solid-state transmitter at 80 foot distance at varying amounts of angular displacement on either side of the beam center.

FIG. 4 shows (derived from FIG. 1) the angular displacement from beam center 30 of each receiver (40a . . . 40h). For example, beam center 30 is centered on the fourth floor receiver 60e. The angle formed between receiver centerline 50 and beam center 30 at receiver 60e is 4.57392 degrees, arrived at by calculating the arc tangent of the "opposite" (4 foot displacement between transmitter 20 and centerline 50) over the "adjacent" (50 foot displacement between receiver 60e and the rooftop. This angle of the beam center off vertical is represented in the "Beam Center" column of FIG. 4. By similar calculations, the angle at receiver 60h would be 2.862405 degrees. The angle from vertical for each of receivers (60e . . . 60h) is shown in the "Deg. off Vert." column of FIG. 4. Therefore, the angular displacement of receiver 60h from beam center 30 would be 1.71 degrees calculated by computing the difference between the beam center 30 angle (4.573921) and the angle of receiver 60h (2.862405). The number of degrees off beam center 30 of each receiver (60a . . . 60h) is shown in the column "Deg. off beam" of FIG. 4.

Referring to FIGS. 1, 3, and 4, it can be seen that if the signal described in FIG. 3 was transmitted from transmitter 20 to "off-beam" receiver 60h, while beam center 30 was aimed at receiver 60e, the signal strength at receiver 60h would be approximately 13 dBmv. This is arrived at by comparing the calculated degrees off center beam (1.71) of FIG. 4 with the power level diagram of FIG. 3.

Looking next at receiver 60d at the 5th floor, the angular displacement off beam center 30 would be −1.14 degrees (from FIG. 4), resulting in an "80 ft." received signal strength of approximately 18 dBmv (from FIG. 3). However, since the distance between receiver 60d and transmitter 20 is approximately 40 feet, or one-half the distance of receiver 60h from transmitter 20, the lowered path loss results in a 6 dBmv increase in received signal strength over the "80 foot" distance power level depicted on FIG. 3. Therefore, the net received signal strength at receiver 60d would be approximately 24 dBmv.

The 7th floor receiver 60b is approximately 20 feet from transmitter 20, or approximately half the path length of transmitter 20 to receiver 60d (40 ft.). Therefore, an additional 6 dBmv, or a total 12 dBmv increase of received signal strength would be realized over the FIG. 3 "80 ft." value. Receiver 60b's angular displacement off beam center 30 is −6.74 at receiver 60b. Therefore, the 12 dBmv path loss increase would be added to the FIG. 3 "80 ft." power lever1 of −5 dBmv, resulting in a net 7 dBmv power level at receiver 60b.

Similarly, receiver 60a at 10 feet is approximately half the path length of transmitter 20 to receiver 60b, resulting in an increase of 18 dBmv over the "80 ft." values of FIG. 3. The 80 ft. dBmv of receiver 60a is −10, resulting in an 8 dBmv received signal at receiver 60a.

Therefore, it can be seen that if a 5 dBmv received signal is required for a particular transmission system, the above-described embodiment of the invention would meet that threshold at each receiver (60a . . . 60h).

It should be noted that an aspect of the instant invention is the taking advantage of side lobes of the transmitted signal to achieve an adequate signal strength at the "closer" receivers.

It should be noted that even though a mathematical model has been demonstrated, the instant invention could be practiced by manually displacing the transmitter from the receiver centerline until line-of-sight reception is attained at all receivers, and then the transmitter could be swiveled until the requisite signal strength at each receiver was attained.

It should also be apparent that the same concept could be employed at a row of houses, where one receiver would be located at each house, and the transmitter could be horizontally displaced from the line of receivers to achieve the same beneficial results.

What has primarily been demonstrated is a way to utilize a low-power, solid state, narrow-beam transmitter to transmit a broad-band signal to numerous receivers simultaneously.

What is claimed is:

1. A system for effecting broadcast radio transmission between a transmitter and a plurality of receivers, the system comprising the transmitter situated in line of sight relationship to the receivers, the transmitter further comprising a directional antenna with the beam focused on the most distant one of the receivers, and the receivers arranged in a linear alignment angular to the beam such that each successively closer receiver to the transmitter has a successively greater angular divergence from the beam, allowing for signal reception utilizing the beam.

2. The system of claim 1 wherein the transmitter is a microwave transmitter.

3. The system of claim 2 wherein the transmitter is a low-power, solid-state transmitter.

4. A method for effecting a broadcast radio transmission between a transmitter and a plurality of receivers, comprising the steps of situating the transmitter in line of sight relationship to the receivers, focusing the transmitter's beam on the most distant one of the receivers, and arranging the receivers in a linear alignment angular to the beam such that each successively closer receiver to the transmitter has a successively greater angular divergence from the beam, allowing for signal reception utilizing the beam.

5. The method of claim 4 wherein the transmitter is a microwave transmitter.

6. The method of claim 5 wherein the transmitter is a low-power, solid-state transmitter.

7. A system for effecting broadcast radio transmission between a transmitter and a plurality of receivers, the system comprising the transmitter situated in line of sight relationship to the receivers, the transmitter further comprising a directional antenna with the beam focused on one of the receivers, the receivers arranged in a linear alignment angular to the beam such that, for the receivers closer to the transmitter than the receiver that is focused on, each successively closer receiver to the transmitter has a successively greater angular divergence from the beam, and the receivers that are more distant from the transmitter than the receiver that is focused on have an angular divergence from the beam that allows for signal reception.

8. The system of claim 7 wherein the transmitter is a microwave transmitter.

9. The system of claim 8 wherein the transmitter is a low-power, solid-state transmitter.

10. A system for effecting broadcast microwave radio transmission between a transmitter on the roof of a building and a plurality of receivers extending from windows linearly aligned down the side of the building from the transmitter, the system comprising an extension to situate the transmitter laterally such that in line of sight relationship is established to each of the receivers, and wherein the transmitter is a solid-state, low power directional antenna with the beam focused on a selected one of the receivers such that the receivers above the selected one are successively closer to the transmitter as the angular alignment with the beam increases.

11. A method for effecting broadcast radio transmission between a transmitter and a plurality of receivers, the method comprising the steps of situating the transmitter in line of sight relationship to the receivers, focusing the beam of the directional antenna of the transmitter on one of the receivers, arranging the receivers in linear alignment angular to the beam such that, for the receivers closer to the transmitter than the receiver that is focused on, each successively closer receiver to the transmitter has a successively greater angular divergence from the beam, and the receivers that are more distant from the transmitter than the receiver that is focused on have an angular divergence from the beam that allows for signal reception.

12. The method of claim 11 wherein the transmitter is a microwave transmitter.

13. The method of claim 12 wherein the transmitter is a low-power, solid-state transmitter.

* * * * *